(12) United States Patent
Yasuda et al.

(10) Patent No.: US 7,297,874 B2
(45) Date of Patent: Nov. 20, 2007

(54) FIXTURE FOR LONG MEMBER

(75) Inventors: Tsukasa Yasuda, Susono (JP); Masahiko Nishihara, Susono (JP)

(73) Assignee: Yazaki Corporation, Tokyo (JP)

( * ) Notice: Subject to any disclaimer, the term of this patent is extended or adjusted under 35 U.S.C. 154(b) by 399 days.

(21) Appl. No.: 10/446,801

(22) Filed: May 29, 2003

(65) Prior Publication Data

US 2004/0026577 A1 Feb. 12, 2004

(30) Foreign Application Priority Data

May 29, 2002 (JP) ............................ P2002-155255

(51) Int. Cl.
*B25B 1/20* (2006.01)
(52) U.S. Cl. .................... 174/154; 174/135; 174/72 A; 248/74.3
(58) Field of Classification Search ................ 174/154, 174/135, 72 A; 248/74.3
See application file for complete search history.

(56) References Cited

U.S. PATENT DOCUMENTS 3,820,758 A * 6/1974 Berg, Jr. et al. .............. 256/10
5,024,405 A * 6/1991 McGuire ...................... 248/73
5,236,158 A * 8/1993 Condon ........................ 248/73
5,920,036 A * 7/1999 Egger ...................... 174/161 F

FOREIGN PATENT DOCUMENTS

JP 8-140235 A 5/1996

\* cited by examiner

*Primary Examiner*—Jinhee Lee
(74) *Attorney, Agent, or Firm*—Sughrue Mion Pllc.

(57) ABSTRACT

A fixture includes a fitting portion fitting a long member, a mounting portion mounting a stationary portion which is shaped into a rectangular in cross section. The mounting portion includes a base portion and a first clamping portion and a second clamping portion. The first clamping portion and the second clamping portion extends in a first direction substantially perpendicular to an extending direction of the base portion from both ends of the base portion. The first and second clamping portion clamps the stationary portion therebetween. The clamping portions respectively has slip-out preventive portions. A projected portion is provided on an inner face of the first clamping portion. The second clamping portion is flexibly formed.

6 Claims, 5 Drawing Sheets

FIXTURE FOR LONG MEMBER

BACKGROUND OF THE INVENTION

The present invention relates generally to fixtures for fitting long members such as grommets and wire harness to stationary portions such as hinges and panels.

In a vehicle, for example, a number of wires such as cables and wire harness and a number of long members such as grommets for protecting the wires passed through the grommets are provided in a prescribed arrangement. In the case of some long member, a relatively soft plastic clip, or a band clip, for example, is fitted to a desired part of the long member in order to avoid its contacting and interfering with another member and by attaching the clip to a vehicle body, the arranged condition (routing) of the long member is decided.

More specifically, in case that a long member is a substantially circular wire harness, the band portion of a clamping band clip is wound on the desired part of the wire harness and the band clip is joined (attached) to the panel of the vehicle body, whereby the wire harness is latched so as to decide the route of the wire harness. When the route of the wire harness is thus decided, the wire harness is allowed to avoid contacting another member, for example, and when such another member is installed later, such another member as another long member or equipment can readily be installed and prevented from becoming entangled with still another member.

Figure 8:
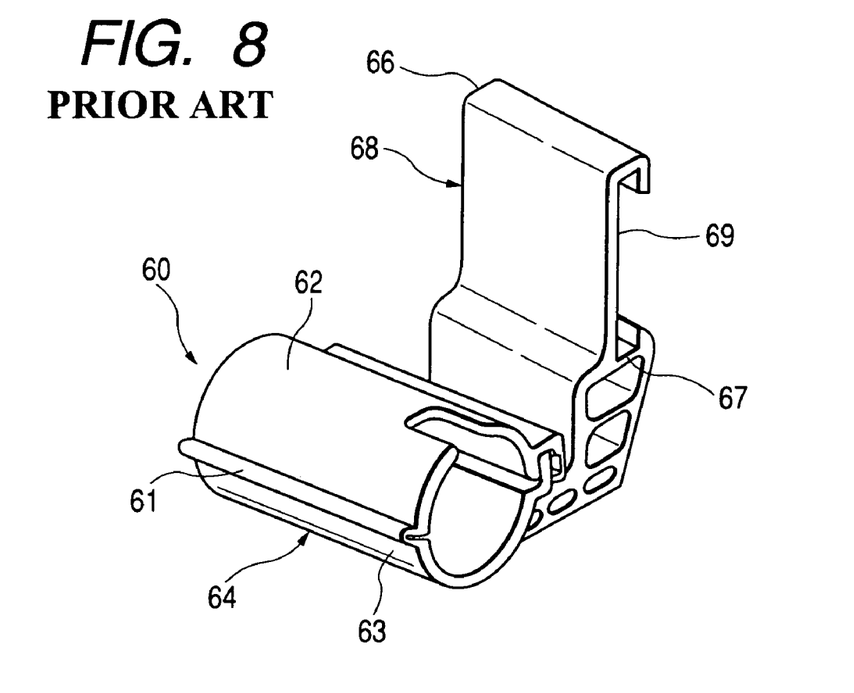
FIG. 8 shows a perspective view of a related fixture for a long member.
Figure 9:
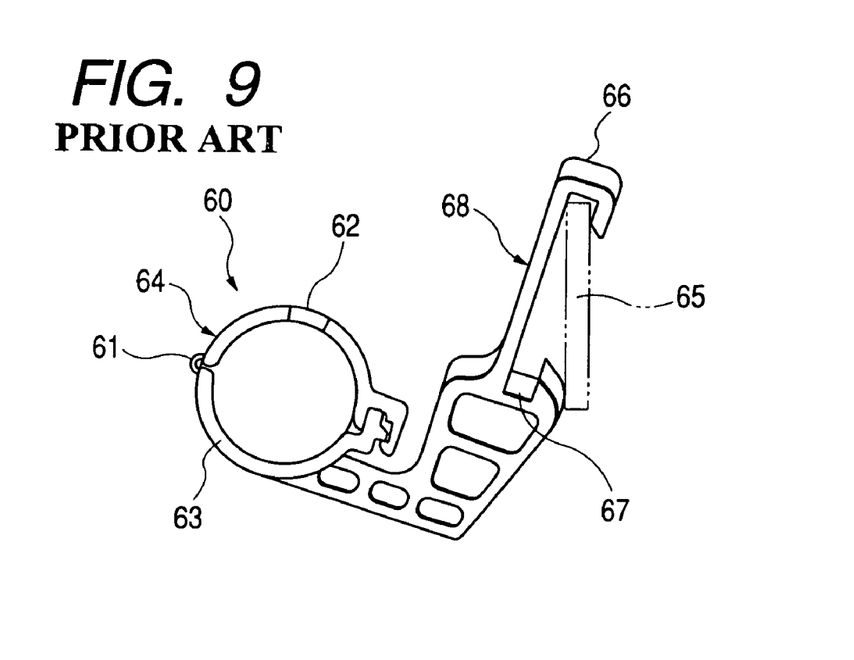
FIG. 9 shows a front view of the related fixture for a long member.

Incidentally, a clip, or a band clip, for example, is used as a fixture for holding the long member above and often formed of relatively soft plastics. However, there is a demand for fixtures capable of holding long members more firmly than hand clips, whereupon the present applicant for patent has proposed a fixture 60 as shown in FIGS. 8 and 9. As shown in FIGS. 8 and 9, the fixture 60 includes two divided bodies 62 and 63 whose end portions on one side are coupled together by a coupling hinge 61 and end portions on the other are detachably joined, a fitting portion 64 installed so as to surround the outer periphery of a long member and a mounting portion 68 including a pair of clamping parts 66 and 67 for clamping the opposed sides (faces) of a panel or a hinge such as a flat plate like hinge 65 rectangular in cross section, the fixture 60, being molded from comparatively high-quality synthetic resin. This fixture 60 is fit for use in holding a grommet for protecting wire harness provided in a prescribed arrangement between the panel of a vehicle body and a movable panel, for example, because the hinge 65 can firmly be fitted to the fixture 60.

More specifically, among electric wires such as wire harness, some wire is used for wiring a section between the panel of the vehicle body and the movable panel such as a door or a trunk panel and these electric wires like wire harness, for example, are protected with grommets that are long members made of elastic material such as rubber. Consequently, it has been proposed to form a grommet of the sort mentioned above into a bellows so that when the movable panel is closed, the grommet in a curved condition can be housed in a grommet housing portion and to attach the fixture 60 to a desired part of the grommet such that the grommet can be housed in the grommet housing portion without being sandwiched between the panel of the vehicle body and the movable panel when the movable panel is closed and that the fixture 60 is fitted to the flat platelike hinge 65 rectangular in cross section.

Though the fixture 60 proposed above can firmly be fitted to the hinge 65, it is not necessarily easy to attach the fixture 60 to the hinge 65, that is, the fitting workability is poor. The mounting portion 68 of the fixture 60 is, to put it concretely, formed so that its length is set substantially equal to the width of the hinge 65 and has a flat platelike contact portion 69 making face-to-face contact with one side of the hinge 65 and a pair of clamping parts 66 and 67 provided along the direction in which the clamping parts 66 and 67 cross the contact portion 69 at substantially right angles on the respective end portions of the contact portion 69. The pair of clamping parts 66 and 67 are respectively folded back toward the contact portion 69 at substantially right angles from positions separated by a length substantially equal to the thickness of the hinge 65 so as to form U-shapes in cross section including both the front end portions of the contact portion 69.

In order to fit the mounting portion 68 to the hinge 65, part of the one side of the hinge 65 is made to contact the inner side of one clamping part 66 and then the other clamping part 67 is pressed against the other side of the hinge 65 so that the other side of the hinge 65 is introduced into the other clamping part 67 because the other clamping part 67 is flexible. At the same time, the one clamping part 66 is moved such that the one side of the hinge 65 slides on the face of the one clamping part 66 and the inner face of the one clamping part 66 makes face-to-ace contact with the one edge face of the hinge 65, whereby the fixture 60 can be fitted to the hinge 65.

However, assuming that the one clamping part 66 is fixedly held when the other side of the hinge 65 is pressed (pushed) in the other clamping part 67 from a condition in which part of the one side of the hinge 65 is caused to contact the inner side of the one clamping part 66, the one side edge of the hinge 65 in contact with the inner face of the one clamping part 66 slides along the inner face of the one clamping part 66. In case that the hinge 65 is made of metal and a sharp edge is formed on the one side of the hinge 65, the edge expected to slide on the inner face of the one clamping part 66 may cut into the inner face of the clamping part 66 and the hinge 65 may also be hardly pressed in between the clamping parts 66 and 67, so that the fitting of the fixture 60 may not simply be carried out.

SUMMARY OF THE INVENTION

It is therefore an object of the present invention to provide a fixture that can readily be fitted to a long member.

In order to achieve the above object, according to the present invention, there is provided a fixture, comprising:
 a fitting portion, fitting a long member; and
 a mounting portion, mounting a stationary portion which is shaped into a rectangular in cross section, and the mounting portion including:
  a base portion; and
  a first clamping portion and a second clamping portion, extending in a first direction substantially perpendicular to an extending direction of the base portion from both ends of the base portion, and clamping the stationary portion therebetween, and the clamping portions respectively having slip-out preventive portions,
 wherein a projected portion is provided on an inner face of the first clamping portion; and
 wherein the second clamping portion is flexibly formed.

In the above configuration, the stationary portion has a first face, a second face and a third face which are adjacent to the first face, and a fourth face which is opposite to the first face, and when the inner face of the first clamping portion is brought into contact with one of the second and third faces of the stationary portion and when the second clamping portion is pressed against the other face out of the second and third faces by making the second clamping portion contact with the stationary portion (edge of the other face out of the second and third faces), the edge of the stationary portion never or hardly cuts into the inner face of the first clamping portion as the projected portion is provided on the inner face of the first clamping portion. Consequently, the second clamping portion can readily be forced onto the other face of the stationary portion, so that the fixture is readily installed likewise.

Preferably, the length of the projected portion is so dimensioned that only the projected portion makes contact with the edge-to-edge face of the stationary portion when the mounting portion is fitted to the stationary portion.

In the above configuration, as edge of the stationary portion never cuts into the inner face of the first clamping part, it is ensured that the second clamping part can readily be forced onto the other face of the stationary portion, so that the fixture is readily installed.

Preferably, the slip-out preventive portion of the second clamping portion has a tilted portion which tilts toward the first clamping portion so as to decrease a thickness thereof in the first direction.

In the above configuration, when the inner face of the first clamping portion is brought into contact with one of the second and third faces of the stationary portion and when the second clamping portion is pressed against the other face out of the second and third faces by making the second clamping portion contact with the stationary portion (edge of the other face out of the second and third faces), the second clamping part is easy to bend as the second clamping portion is formed with the contact portion and the tilted portion tilted toward the opposite side to the first clamping portion with respect to the contact portion and consequently the second clamping part can readily be forced onto the other face of the stationary portion, so that the fixture is readily installed.

According to the present invention, there is also provided a fixture, comprising:

a cylindrical fitting portion, fitting a long member; and a mounting portion, mounting a stationary portion which is shaped into a rectangular in cross section, and the mounting portion including:

a base portion; and a first clamping portion and a second clamping portion, extending in a first direction substantially perpendicular to an extending direction of the base portion from both ends of the base portion, and clamping the stationary portion therebetween, and the clamping portions respectively having slip-out preventive portions, wherein the fitting portion is formed by a first divided body and a second divided body, each has a retaining portion;

wherein the retaining portions are protruded from an outer face of the cylindrical fitting portion when the first and second divided bodies are engaged by the retaining portions; and wherein the engaged retaining portions are positioned on the fitting portion so as to serve a point of applying power when mounting the fixture to the stationary portion by using a principle of leverage.

In the above configuration, when the inner face of the first clamping portion is brought into contact with one of the second and third faces of the stationary portion and when the second clamping portion is pressed against the other face out of the second and third faces by making the second clamping portion contact with the stationary portion (edge of the other face out of the second and third faces), the joint of the divided bodies functions as a swivel stopper as the position of gripping the divided bodies conforms to the mating position and consequently the second clamping portion can readily be forced onto the other face of the stationary portion, so that the fixture is readily installed.

Preferably, the retaining portions are extended in an axial direction of the cylindrical fitting portion from one edge to the other edge thereof.

Accordingly, it is ensured that the divided bodies can be joined together and that the second clamping portion can readily be forced onto the other face of the stationary portion since the retaining portions of the divided bodies serves as a swivel stopper, so that the fixture is readily installed.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

An embodiment of the invention will now be described in detail by reference to the accompanying drawings.

FIGS. 1 to 4 and FIG. 7 show an example of a fixture for a long member according to the invention. FIGS. 5 and 6 show a modified example of a fixture for a long member according to the invention. In FIGS. 1 to 7, a fixture 1 is used for fitting a long member such as a grommet 2 to a hinge 3 as a stationary portion.

The stationary portion is not limited to the hinge 3 but may be the panel of a vehicle body or any other panel and is a flat platelike portion rectangular in cross section. In this embodiment of the invention, a description will be given of a hinge provided between the panel of the vehicle body (not shown) and a movable panel (not shown) (capable of opening and shutting) such as a door or a trunk panel.

The long member is a grommet for protecting a wire such as wire harness passed through the long member and in this embodiment of the invention, the grommet 2 provided in a prescribed arrangement between the panel of the vehicle body (not shown) and the movable panel (not shown).

Figure 7:
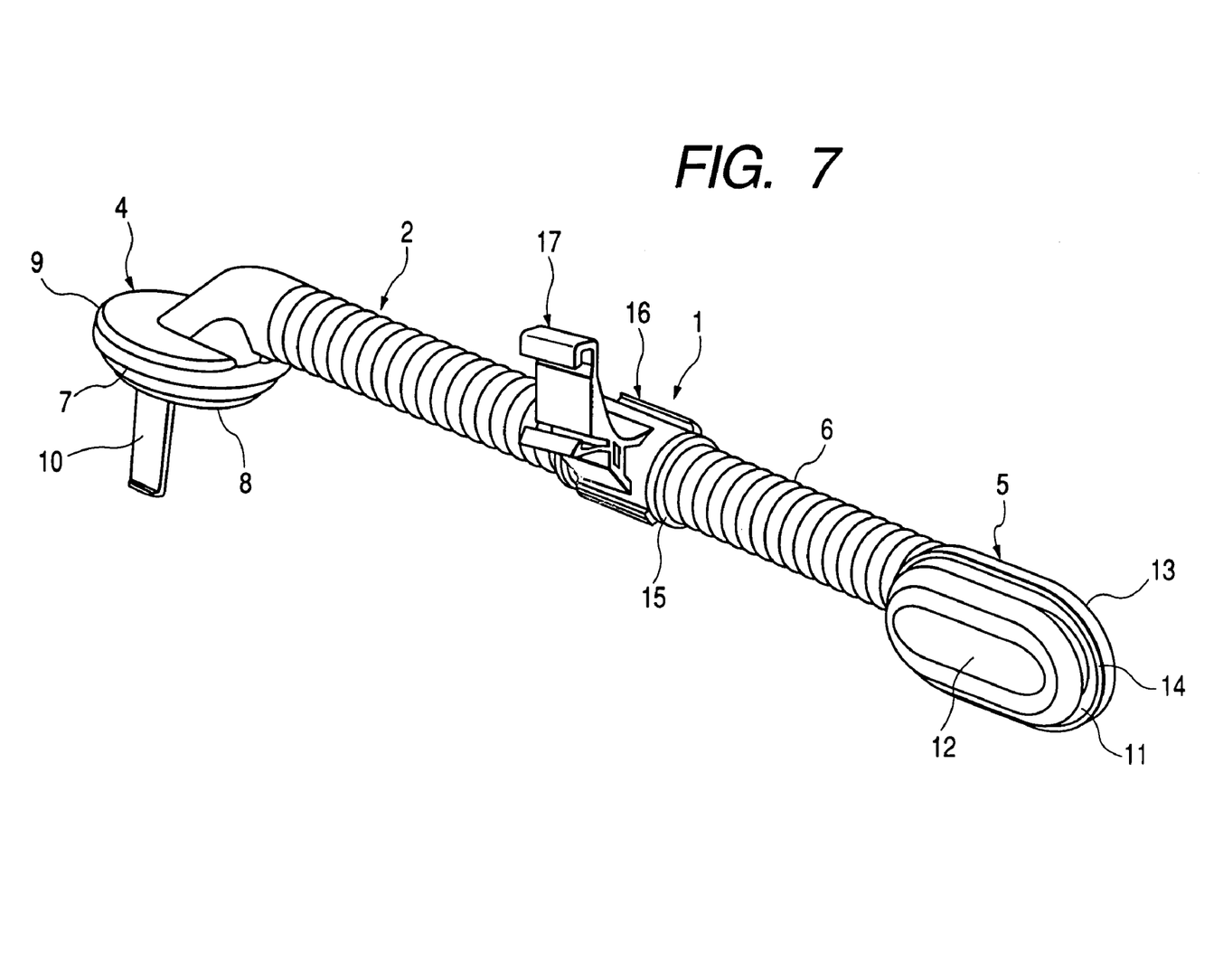
FIG. 7 shows a perspective view of an example of the fixture fitted to a grommet as a long member according to the invention.

As shown in FIG. 7, the grommet 2 has two of a first and a second fitting portions 4, 5 respectively fitted into a first through-hole of the panel of the vehicle body and a second through-hole of the movable panel and a bellows-like cylindrical grommet body 6 for coupling the first and second fitting portions 4, 5 together with wire harness passing through the grommet body 6, the grommet 2 being integrally molded in a flexible form from an elastic member of rubber such as EPDM, CR or NBR.

The first and second fitting portions 4, 5 are formed in a manner corresponding to the configurations of the through-holes of the panels attached. For example, the first fitting portion 4 is attached to the first through-hole, whereas the second fitting portion 5 is attached to the second through-hole.

The first fitting portion 4 is formed into a curved shape that is not circular nor elliptical but intermediate therebetween and its outer diameter is greater than the inner diameter of the first through-hole and its inner diameter is smaller than the inner diameter of the first through-hole. Moreover, the first fitting portion 4 is formed into a cylindrical shape so that the wire harness can pass therethrough. In the substantially central portion of the outer peripheral face of the first fitting portion 4, a first mating groove 7 is provided along the peripheral direction of the first fitting portion 4. The size of the base wall of the first mating groove 7 is set preferably and substantially equal to or slightly greater than the inner diameter of the first through-hole. The width of the first mating groove 7 is set preferably and substantially equal to or slightly shorter than the thickness of the panel of the vehicle body in which the first through-hole is formed.

The outer peripheral face of the first fitting portion 4 is divided by the first mating groove 7 into a first insertion portion 8 and a first contact portion 9 along the axial direction of the first mating groove 7. The outer diameter of the first contact portion 9 is set so that the first contact portion 9 is not allowed to be inserted into the first through-hole. When the first mating groove 7 is mated with the through-hole in the end portion of the side where the first mating groove 7 of the first contact portion 9 is formed, a seal portion (not shown) protruding along the end portion (peripheral direction) in the direction of the mating groove is provided so that a section between the first fitting portion 4 and the panel of the vehicle body is sealed up.

The first insertion portion 8 is greater in size than the inner diameter of the first through-hole and undergoes forced-in (elastic) deformation when forced into the first through-hole, whereby the first insertion portion 8 can be inserted into the first through-hole. For example, the outer diameter of the substantially central portion of the first insertion portion 8 is greatest and the fare of the first insertion portion 8 is gradually tilted from the central portion toward both the end portion sides. Further, the side of the first mating groove 7 of the first insertion portion 8 may be in the form of a plane extending in substantially parallel to the direction of perpendicularly passing through the wire harness.

The end portion of the first insertion portion 8 set opposite to the first mating groove 7 preferably has a diameter smaller than the diameter of the first through-hole so as to be easily inserted into the first through-hole.

A wire-harness holding portion 10 that is used for fixedly holding the wire harness by winding a winding member or a tape (not shown), for example, on the wire harness with its inner peripheral face extending along the direction of passing through the wire harness is provided to the first insertion portion 8 of the first fitting portion 4.

The second fitting portion 5 is formed into a curved shape close to a slender ellipse and its outer diameter is greater than the inner diameter of the second through-hole and its inner diameter is smaller than the inner diameter of the second through-hole. Moreover, the second fitting portion 5 is formed into a cylindrical shape so that the wire harness can pass therethrough. In the substantially central portion of the outer peripheral face of the second fitting portion 5, a first mating groove 11 is provided along the peripheral direction of the second fitting portion 5. The size of the base wall 12 of the second mating groove 11 is set preferably and substantially equal to or slightly greater than the inner diameter of the second through-hole. The width of the second mating groove 11 is set preferably and substantially equal to or slightly shorter than the thickness of the movable panel in which the second through-hole is formed, The outer peripheral face of the second fitting portion 5 is divided by the second mating groove 11 into a second insertion portion 12 and a second contact portion 13 along the axial direction of the second mating groove 11. The outer diameter of the second contact portion 13 is set so that the second contact portion 13 is not allowed to be inserted into the second through-hole. When the second mating groove 11 is mated with the through-hole in the end portion of the side where the second mating groove 11 of the second contact portion 13 is formed, a seal portion 14 protruding along the end portion (peripheral direction) in the direction of the mating groove is provided so that a section between the second fitting portion 5 and the movable panel is sealed up.

The second insertion portion 12 is greater in size than the inner diameter of the second through-hole and undergoes forced-in (elastic) deformation when forced into the second through-hole, whereby the second insertion portion 12 can be inserted into the second through-hole. For example, the outer diameter of the substantially central portion of the second insertion portion 12 is greatest and the face of the second insertion portion 12 is gradually tilted from the central portion toward both the end portion sides. Further, the side of the second mating groove 11 of the second insertion portion 12 may be in the form of a plane extending in substantially parallel to the direction of perpendicularly passing through the wire harness.

The opposite end portion of the second insertion portion 12 to the second mating groove 11 preferably has a diameter smaller than the diameter of the second through-hole so as to be easily inserted into the second through-hole.

The grommet body 6 is formed into a cylindrical shape through which the wire harness is passed and also into a bellows so as to bend and curve. The first and second fitting portions 4, 5 are formed integrally with the respective end portions of the grommet body 6. More specifically, the contact portions 9 and 13 of the first and second fitting portions 4, 5 are provided along the direction substantially perpendicular to the direction in which the fitting portions 4, 5 are extended in the respective end portions of the grommet body 6 (so that the wire harness is passed through the fitting portions 4, 5 and the grommet body 6 in directions perpendicular to each other). Moreover, the first and second fitting portions 4, 5 are provided in the respective end portions of the grommet body 6 so that the openings of the insertion portions 8 and 12 of the first and second fitting portions 4, 5 are directed to substantially the same direction.

The bellows-like shape of the grommet body 6 may be any other shape as long as the grommet body 6 can be bend and curved.

The length of the grommet body 6 is preferably set to a dimension or greater at which the distance between the first and second through-holes is made greatest when the movable panel is moved with the first and second fitting portions 4, 5 respectively attached to the first through-hole of the panel of the vehicle body and the second through-hole of the movable panel; for example, the length thereof is most preferably set to a dimension slightly greater than the maximum dimension. The durability of the grommet 2 is improved because almost no tensile strength acts on the grommet body 6 in the its axial direction when the movable panel is moved.

A fixture mounting portion 15 is provided in the substantially central portion of the grommet body 6. The fixture mounting portion 15 is formed into a cylindrical shape and the fixture 1 is installed so as to surround the peripheral face of the fixture mounting portion 15.

As shown in FIGS. 1 to 7, the fixture 1 having a fitting portion 16 fitted to the fixture mounting portion 15 of the grommet body 6 and a mounting portion 17 provided to the fitting portion 16 and fitted to the hinge 3, the fixture 1 being integrally molded from comparatively hard synthetic resin.

Figure 1:
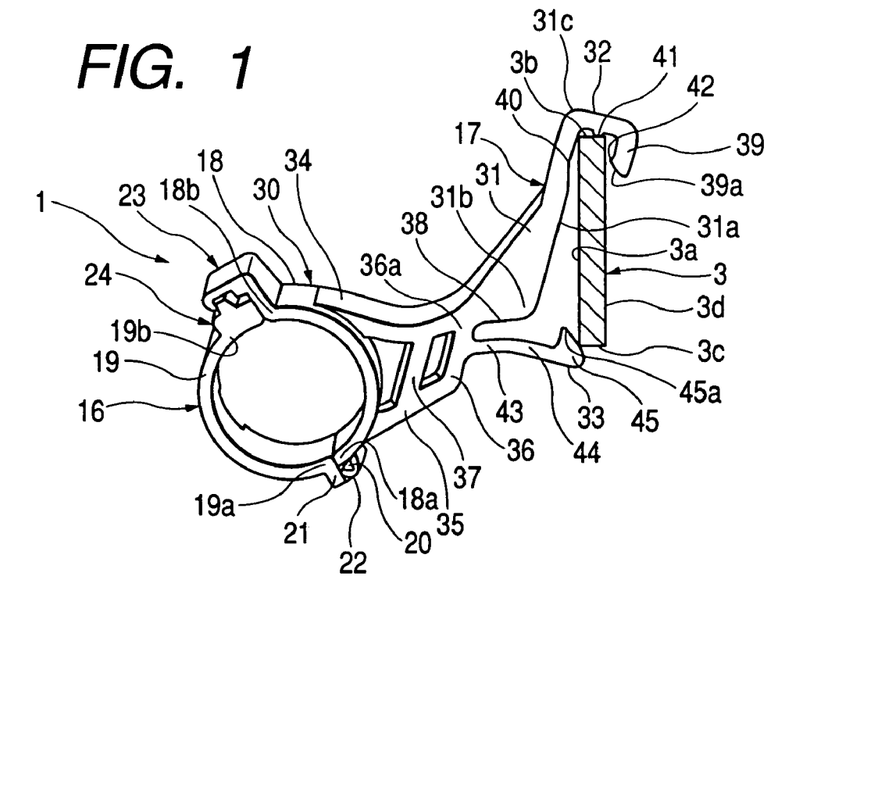
FIG. 1 shows a front view of an example of a fixture for a long member according to the invention.

The fitting portion 16 comprises a first and a second divided bodies 18 and 19 resulting from dividing a cylindrical body into two. The length (in the axial direction) of the fitting portion 16 is determined optionally from the range of making it feasible to firmly fitting the fitting portion 16 to the grommet body 6 and the dimension of making the fitting portion 16 attachable to the fixture mounting portion 15 of the grommet body 6. The inner diameter of the fitting portion 16 is preferably set substantially equal to the outer diameter of the fixture mounting portion 15.

The first and second divided bodies 18 and 19 may be created without regard to the configurations of the bodies as long as they can be mounted on the fixture mounting portion 15. However, two of the substantially semicircular divided bodies as illustrated are preferred.

Although means for coupling the end portions of the first and second divided bodies 18 and 19 may be those for detachably coupling both the end portions thereof, preferably the end portions on one side are coupled together by a coupling hinge flexibly and integrally, whereas the end portions on the other are detachably coupled together by a mating structure.

More specifically, portions 20 and 21 projected diametrically outward are provided in one-side end portions (first end portions) 18a and 19a of the respective first and second divided bodies 18 and 19, for example. The projected portions 20 and 21 are integrally and flexibly coupled by a coupling hinge 22. The coupling hinge 22 is formed preferably over the substantially whole area of the first and second divided bodies 18 and 19 in their axial direction. In this case, as shown in FIG. 6, the first end portions 18a and 19a of the first and second divided bodies 18 and 19 may be coupled without providing the projected portions 20 and 21.

Figure 2:
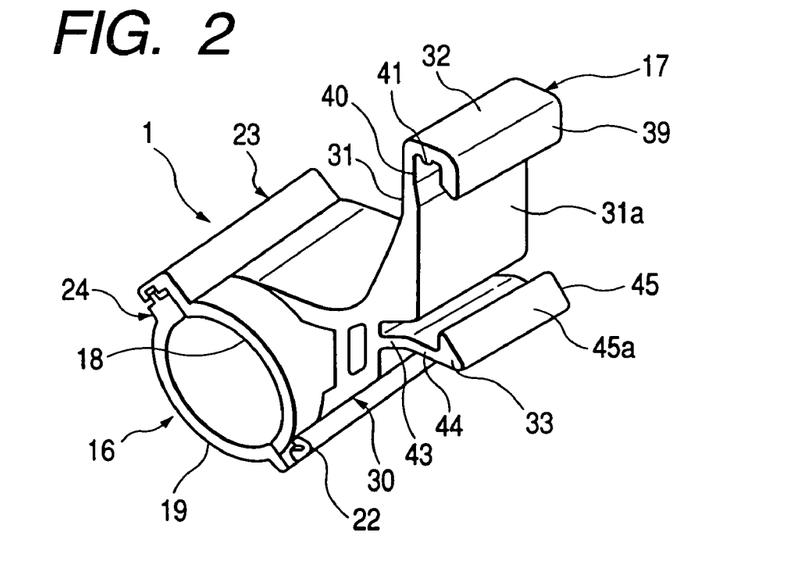
FIG. 2 shows a perspective view of an example of the fixture for a long member according to the invention.
Figure 3:
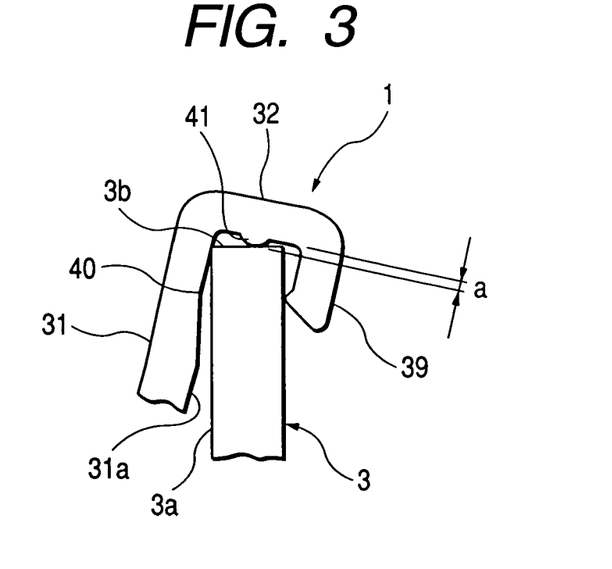
FIG. 3 shows an enlarged view of a first clamping part in combination of a first slip-out preventive portion in FIG. 1 according to the invention.
Figure 4:
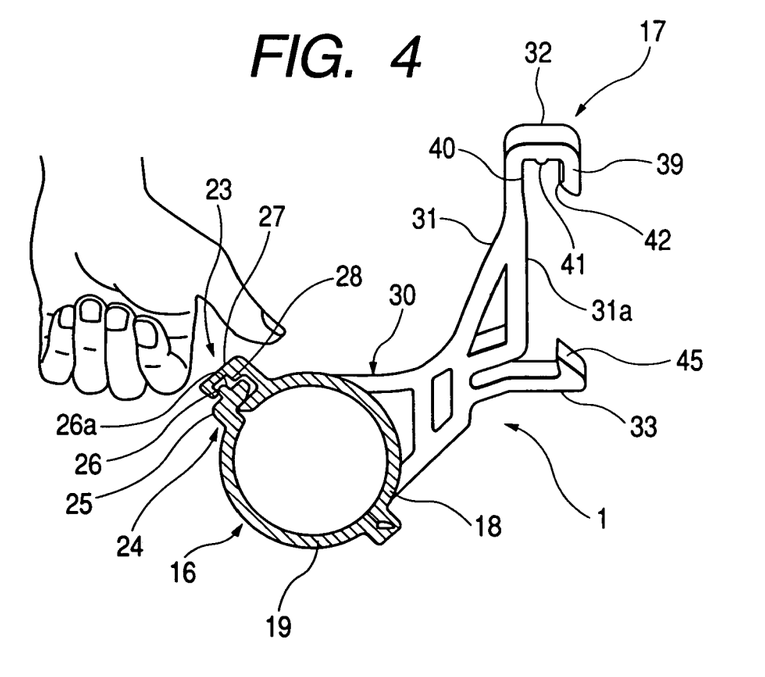
FIG. 4 shows a partial sectional front view of the fixture that is mounted on a long member according to the invention.
Figure 5:
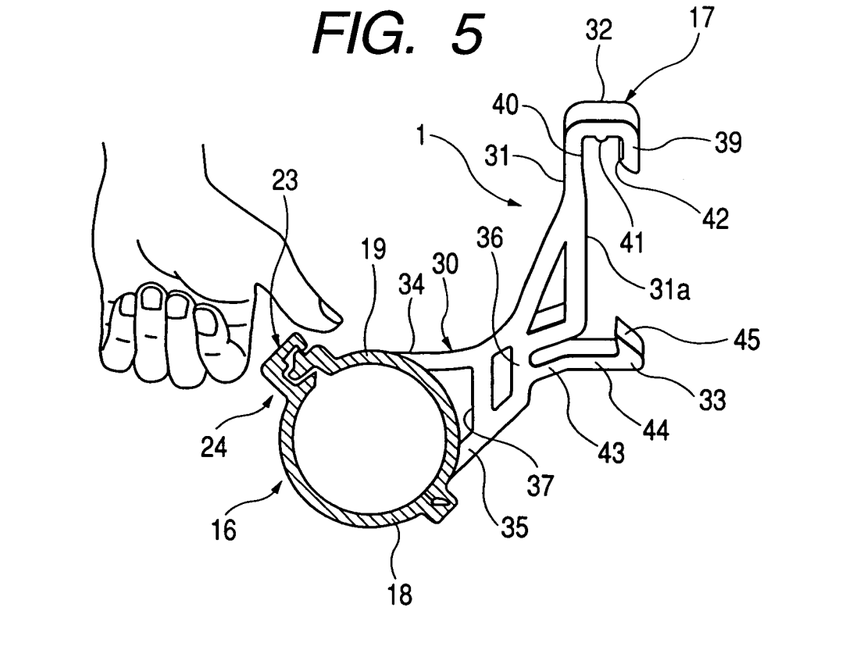
FIG. 5 shows a front view of a modified example of the fixture for a long member according to the invention.
Figure 6:
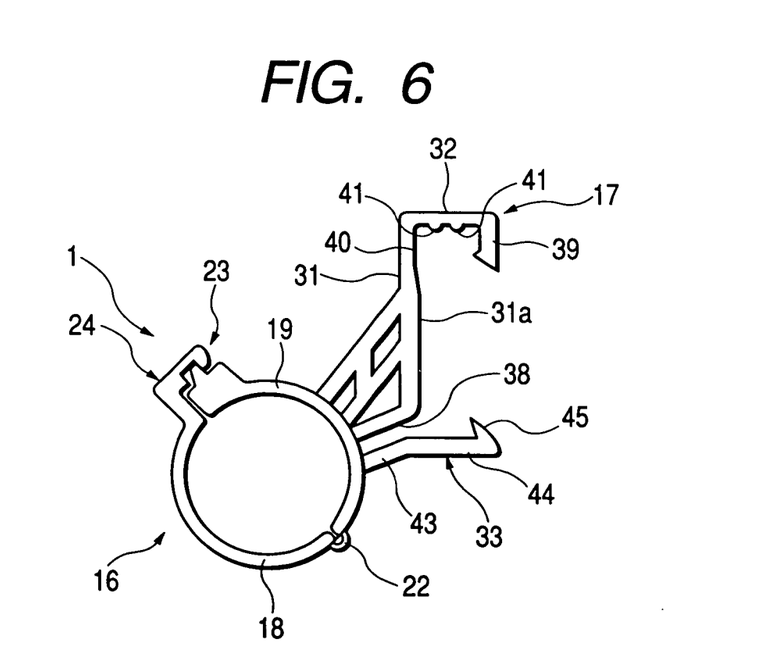
FIG. 6 shows a front view of another modified example of the fixture for a long member according to the invention.

As shown in FIGS. 1 to 6, a mating recess portion 23 and a mating protruded portion 24 are provided in the-other-side end portions (second end portions) 18b and 19b of the first and second divided bodies 18 and 19. The mating protruded portion 24 projected diametrically outward is provided in the second end portion 19b of the second divided body 19, for example. The mating protruded portion 24 is provided preferably over the substantially whole area of the second divided body 19 in its axial direction. The mating protruded portion 24 is formed such that one or both side end portions of the end portion of the second divided body 19 is as shown in FIG. 1 formed in a protruded form and the rest is formed in a cutout form as shown in FIG. 4 so that the protruded base portion is positioned in the second end portion 18b (extended portion) of the first divided body. In other words, a portion other than the side end portion of the mating protruded portion 24 is formed such that the second end portion 19b of the second divided body 19 is folded back diametrically outward and then folded back in a direction substantially perpendicular to the diametrical direction and also folded back toward the first divided body 18 and moreover a mating protruded portion 26 is directed to the outer face of the mating part 25 thus folded back. With these mating part 25 and the mating protruded portion 26, the mating protruded portion 24 is formed into a protruded shape in cross section.

The mating protruded portion 26 on the side of the first divided body 18 is tilted to form a tilted face 26a.

The mating recess portion 23 is provided preferably over the substantially whole area of the first divided body 18 in the axial direction of the second end portion 18b. The mating recess portion 23 is such that one or both side end portions (corresponding the mating protruded portion 24) of the end portion of the first divided body 18 is as shown in FIG. 1 folded back diametrically outward and then folded back in a direction substantially perpendicular to the diametrical direction and also folded back toward the second divided body 18 and moreover a recess portion 28 mating with the mating protruded portion 26 is provided on the inner face of the mating part 27 thus folded back. With these mating part 27 and the recess portion 28, the mating recess portion 23 is formed into a substantially hollow shape in cross section. Further, a portion other than the side end portion of the mating recess portion 23 is as shown in FIG. 4 formed such that an extended portion along the arcuate shape of the first divided body 18 is provided and that the extended portion and another portion form a substantially U-shape into which the mating part 25 of the mating protruded portion 24 is inserted and fitted so as to mate the mating recess portion 23 and the mating protruded portion 24 together. The mounting portion 17 is uprightly provided integrally with the outer face of the first divided body 18 as shown in FIGS. 1, 2 and 4.

The mounting portion 17 has a base portion 30, a contact portion 31 and a pair of clamping parts 32 and 33. The mounting portion 17 is provided on the outer face of the first divided body 18 in its whole or part of axial direction.

One side (a first leg portion 34) of the base portion 30 is uprightly provided from the central portion of the first divided body 18 toward the mating recess portion 23 and the other side (a second leg portion 35) thereof has a pair of leg portions 34 and 35 uprightly provided near the projected portion 20 and a first and a second coupling portions 36 and 37 for coupling the upper and intermediate portions of the leg portions 34 and 35.

The first and second coupling portions 36 and 37 are provided in a prescribed arrangement in parallel to a direction substantially perpendicular to the tangential direction of the first divided body 18 where the outer side of the first leg portion 34 is uprightly provided.

The contact portion 31 is provided in the end portion (first end portion) 36 of the first coupling portion 36 on the side of the mating recess portion 23.

The contact portion 31 has a planar portion 31a, which makes face-to-face contact with part of one face (a first face) 3a of the hinge 3.

The contact portion 31 is set substantially parallel to the first coupling portion 36 and disposed on the opposite side to the second coupling portion 37 and in such a position as is separated from the second coupling portion 37. At the same time, the end portion (first end portion) 31b of the contact portion 31 is formed via a tilted portion 38 tilting from the first end portion 36a of the first coupling portion 36 to the opposite side to the other end portion. In other words, the first coupling portion 36 and the tilted portion 38 are formed at obtuse angles.

The first clamping part 32 is provided integrally with the end portion (second end portion) 31c of the contact portion 31 on the opposite side to the first end portion 31b. The first clamping part 32 is formed in an extended condition so as to be folded back at substantially right angles with the face of the planar portion 31a of the contact portion 31 and the front end portion of the clamping part 32 is formed in an extended condition so as to be further folded back at substantially right angles with the side of the contact portion 31 whereby to form a first slip-out preventive portion 39. In other words, a substantially U-shape in cross section is formed by the side of the second end portion 31c of the contact portion 31, the first clamping part 32 and the first slip-out preventive portion 39. As a molding die is formed into a substantially U-shape as shown in the drawings when U-shaped portions (though not limited to the substantially U-shaped portions but inclusive of the fixture 1) are molded, the slip-out preventive portion 39 can fall down toward the contact portion 31 after the U-shaped portion is molded and in this case, the molding die may be formed into a shape allowing for such a falling-down (the U-shape in which the first slip-out preventive portion 39 is anticipated to fall down toward the contact portion 31) in order to mold the fixture 1.

The length of the inner face of the first clamping part 32 (the space between the planar portion 31a of the contact portion 31 and the inner face of the first slip-out preventive portion 39) is optionally decided in proportion to the thickness of a stationary portion to be mounted; to put it concretely, the length thereof is set preferably and substantially equal to or slightly greater than the thickness of the hinge 3, for example.

A portion from the central portion of the planar portion 31a of the contact portion 31 up to the substantially central portion of the second end portion 31c is formed into a depressed portion 40 that is depressed more than the other inner face.

As shown in FIG. 1, the inner face of the first clamping part 32 is brought into contact with one of the sides (second and third faces) 3b and 3c, in this case, the second face 3b, for example, extending along the thickness direction of the hinge 3. A projected portion 41 being brought into contact with the second (edge-to-edge) face 3b of the hinge 3 when the second clamping part 33 is brought into contact with the edge of the third face 3c of the hinge 3 is provided on the inner face of the first clamping part 32. Although only one projected portion 41 is illustratively shown, more than one projected portion, for example, two of them as shown in FIG. 6 may be provided in the length direction of the inner face of the clamping part.

When the mounting portion 17 is fitted to the hinge 3, the projected portion 41 brings the inner face of the first clamping part 32 into contact with the second face 3b of the hinge 3 and then brings the second clamping part 33 into contact with the edge of the third face 3c of the hinge 3 whereby to cause the side of the second clamping part 33 to press against the third face 3c of the hinge 3. When the mounting portion 17 is thus fitted to the hinge 3, the projected portion 41 has a length A (see FIG. 3) so that the edge of the second face 3b positioned on the side of the first slip-out preventive portion 39 is preferably so as not to contact the inner face of the first clamping part 32.

Although the length of the slip-out preventive portion 39 is determined optionally from the range of preventing the hinge 3 positioned between the first and second clamping parts 32 and 33 from slipping off, because the hinge 3 becomes hardly positioned between the first and second clamping parts 32 and 33 if the length of the slip-out preventive portion 39 is too great, it is preferred to make the length thereof substantially equal to the length of the inner face of the first clamping part 32, for example.

As shown in FIGS. 1 to 6, a projected portion 42 is provided in the front end portion of the inner face of the first slip-out preventive portion 39. The front edge face of the slip-out preventive portion 39 is formed as a tilted face 39a tilting from the inner face over the outer face of the slip-out preventive portion 39. In other words, the front end portion of the first slip-out preventive portion 39 is formed so that the outer face is set greater than the inner face toward the first end portion 31b of the contact portion 31.

The second clamping part 33 is flexibly and uprightly provided near the first end portion 36a of the first coupling portion 36. The second clamping part 33 is connected integrally to the first coupling portion 36 and has a tilted portion 34 (referred to as "extension portion " in the claims) extending in substantially parallel to the tilted portion 38 of the contact portion 31 and a contact portion 44 bending from the first coupling portion 36 slightly closer to the extended line of the planar portion 31a of the contact portion 31 of the tilted portion 43 and extending along a direction crossing the planar portion 31a at substantially right angles. In other words, the second clamping part 33 is such that its face (outer face) opposite to the contact portion 31 is bent at an obtuse angle.

A second slip-out preventive portion 45 protruding toward the contact portion 31 is formed on the side of the contact portion 31 of the front end portion of the contact portion 44 of the second clamping part 33. The protruded length of the second slip-out preventive portion 45 is dimensioned within the maximum range of making the second clamping part 33 flexible in the position of the second slip-out preventive portion 45.

The second slip-out preventive portion 45 on the side of the contact portion 31 is in substantially parallel to the planar portion 31a of the contact portion 31 and its opposite side to the contact portion 31 is formed as a tilted face 45a gradually tilting from the front end portion of the contact portion 31 up to the front end portion of the contact portion 44, that is, the second slip-out preventive portion 45 is in the form of a substantially right triangle.

The length of the face from a position on the extended line of the planar portion 31a of the second clamping part 33 up to the second slip-out preventive portion 45 is optionally decided in proportion to the thickness of the stationary portion; to put it concretely, the length thereof is set preferably and substantially equal to the thickness of the hinge 3, for example.

The space between the inner face of the contact portion 44 of the second clamping part 33 and the front end portion of the projected portion 41 of the first clamping part 32 is preferably set substantially equal to or slightly shorter than the width (space between the second face 3b and the third face 3c) of the hinge 3.

When the mounting portion 17 is thus provided integrally to the first divided body 18 as shown in FIG. 1, the projected portion 41 of the first clamping part 32 is brought into contact with the second face 3b of the hinge 3 and then the second clamping part 33 is brought into contact with the edge of the third face 3c of the hinge 3 to cause the side of the second clamping part 33 to press against the third face 3c of the hinge 3 whereby to fit the mounting portion 17 to the hinge 3; at this time it is preferred to fit the mounting portion 17 to the first divided body 18 so that the mating recess portion 23 and the mating protruded portion 24 projecting from the respective divided bodies 18 and 19 are positioned at a location (to which pressing force is applied) where these recess and protruded portions 23 and 24 can be touched by the fingers and the like. Incidentally, as shown in FIGS. 5 and 6, the mounting portion may be provided integrally to the second divided body and even in this case, the mounting portion is preferably provided to the second divided body in a position to which such pressing force is applied.

Although the contact portion 31 and the second clamping part 33 are provided to the divided body (first divided body 18 in the example of FIG. 1) via the base portion 30, the contact portion 31 and the second clamping part 33 may be provided directly to the divided body, for example, the second divided body 19 as shown in FIG. 6.

In order to fit the grommet 2 to the hinge 3 by using the fixture 1, the first and second divided bodies 18 and 19 are released from being joined and opened up first. Then the fixture mounting portion 15 of the grommet 6 is covered with the first and second divided bodies 18 and 19 so as to cover the peripheral face of the grommet 6 and by joining the mating recess portion 23 and the mating protruded portion 24 together, the fixture 1 is fitted to the grommet 2. At this time, a swivel stopper may be provided for the fixture 1 and the fixture mounting portion 15 to stop them from swiveling in the peripheral direction. More specifically, the fixture mounting portion 15 may be provided with a mating projection and moreover one of the first and second divided bodies of the fixture 1 may be provided with a portion mating with the mating projection, for example.

The first clamping part 32 of the fixture 1 fitted to the grommet 2 is as shown in FIG. 1 brought into contact with the second face 3b of the hinge 3. In other words, the inner face of the first clamping part 32 is brought into contact with the second face 3b of the hinge 3 such that the first clamping part 32 is hooked on the hinge 3. At this time, the projected portion 41 of the inner face of the first clamping part 32 is brought into contact with the second face 3b of the hinge 3 of the hinge 3 and at the same time the edge of the second face 3b with respect to the first face 3a is brought into contact with or adjacent to the depressed portion 40.

The second clamping part 33 is brought into contact with the third face 3c of the hinge 3. More specifically, the tilted face 45a of the slip-out preventive portion 45 of the second clamping part 33 is brought into contact with the edge of the third face 3c with respect to the first face 3a. The clamping part 33 is pressed toward the third face 3c from the condition above. Then the second clamping part 33 (tilted face 45a of the second slip-out preventive portion 45) is pressed against the hinge 3 so as to bend in the direction of being alienated from the contact portion 31. When the front end portion of the second clamping part 33 is caused to curve to an extent greater than the protruded length of the second slip-out preventive portion 45, the second slip-out preventive portion 45 of the second clamping part 33 moves while sliding on the third face 3c and then the contact portion 44 of the second clamping part 33 is brought into face-to-face contact with the third face 3c of the hinge 3 and moreover the face of the second slip-out preventive portion 45 on the side of the contact portion 31 is brought into face-to-face contact with a fourth face 3d. Simultaneously with or substantially simultaneously with the contact action above comes the face-to-face contact of the first face 3a of the hinge 3 with the planar portion 31a. Further, the projected portion 42 of the first slip-out preventive portion 39 is brought into contact with the fourth face 3d.

Thus the fixture 1 can be fitted to the hinge 3 and the grommet 2 can also be fitted to the hinge 3. At this time, the fixture 1 is prevented by the planar portion 31a of the contact portion 31, the projected portion 42 of the first slip-out preventive portion 39 and the second slip-out preventive portion 45 from moving in the thickness direction of the hinge 3. At the same time, the fixture 1 is also prevented by the projected portion 41 of the first clamping part 32 and the contact portion 44 of the second clamping part 33 from moving in the thickness direction of the hinge 3, whereby the grommet 2 can be fitted to the hinge 3 via the fixture 1.

When the second clamping part 33 is pressed toward the third face 3c of the hinge 3, the edge of the second face 3b of the hinge 3 with respect to the fourth face 3d never or hardly cuts into the inner face of the first clamping part 32 since the projected portion 41 of the first clamping part 32 is kept in contact with the second face 3b of the hinge 3. In other words, the hinge 3 disposed between the panel of the vehicle body and the movable panel is formed of metal, for example, iron and often made sharp. In this case, the first clamping part 32 moves in the direction of the edge of the second face 3b with respect to the fourth face 3d of the hinge 3 when the second clamping part 33 is pressed toward the third face 3c of the hinge 3. Consequently, in case that the edge of the second face 3b with respect to the fourth face 3d of the hinge 3 is brought into direct contact with the inner face of the first clamping part 32 without the formation of the projected portion 41, the first clamping part 32 may cut into that edge. However, as the projected portion 41 is brought into contact with the second face of the hinge 3, the edge of the second face 3b with respect to the fourth face 3d of the hinge 3 hardly or never cuts into the first clamping part 32.

In particular, as the length A of the projected portion 41 allows the edge of the second face 3b positioned on the side of the first slip-out preventive portion 39 to be so dimensioned as not to contact the inner face of the first clamping part 32, the edge of the second face 3b with respect to the fourth face 3d of the hinge 3 never contacts the first clamping part 32.

Thus the second clamping part 33 can easily be pressed (forced-in) toward the third face 3c of the hinge 3, so that the fixture 1 is readily installed.

Moreover, as the formation of the depressed portion 40 in the planar portion 31a of the contact portion 31 makes it difficult to bring the edge of the second face 3b with respect to the first face 3a into contact with the planar portion 31a when the first clamping part 32 is brought into contact with the second face 3b of the hinge 3, whereby the first clamping part 32 can easily be brought into contact with the second face 3b of the hinge 3.

Since the second clamping part 33 is formed with the tilted portion 43 and the contact portion 44 and connected integrally to the first coupling portion 36, the second clamping part 33 is easy to bend when the second clamping part 33 is pressed toward the third face 3c of the hinge 3, so that the fixture 1 is readily installed. In other words, when the second clamping part 33 is directly connected to the planar portion 31a of the contact portion 31, in case that the second clamping part is formed with only the contact portion 44 without the tilted portion 43, this second clamping part is less flexible than the second clamping part 33 having the tilted portion 43 and the contact portion 44.

Since the tilted portion 43 and the contact portion 44 are tilted in the direction of bending the tilted portion 43 and the contact portion 44 (the opposite side (outer face) to the contact portion 31 is bent at an obtuse angle), the second clamping part 33 is easy to bend in comparison with what has the tilted portion 43 and the contact portion 44 that are linearly arranged. In the case that the tilted portion 43 and the contact portion 44 are linearly arranged, the whole stress is applied to the connected part of the first coupling portion 36 when the tilted portion 43 and the contact portion 44 that are bent. However, when the tilted portion 43 and the contact portion 44 are bent at an obtuse angle on the opposite face (outer face) to the contact portion 31, the stress applied to the connected part of the first coupling portion 35 is lowered when the second clamping part 33 is bent as part of the stress is absorbed by the bent part when the tilted portion 43 and the contact portion 44 are bent. Accordingly, nonconformity arising from damage, cracks and so on become hardly produced and durability is improved.

Since the mounting portion 17 is provided to the first divided body 18 so that when the second clamping part 33 is pressed toward the third face 3c of the hinge 3, the mating recess portion 23 and the mating protruded portion 24 protruding from the respective divided bodies 18 and 19 are positioned at the location (to which pressing force is applied) where these recess and protruded portions 23 and 24 can be touched by the fingers and the like, so that the fixture 1 is readily installed.

In other words, as shown in FIG. 1, the projected portion 41 of the first clamping part 32 is brought into contact with the second face 3b and the second clamping part 32 is brought into contact with the edge of the third face 3c of the hinge 3 with respect to the first face 3a. When the second clamping part 33 is pressed toward the third face 3c of the hinge 3, the pressing direction is not the direction along the third face 3c but the direction of pivoting the second-clamping part 33 with the location where the first clamping part 32 and the first slip-out preventive portion 39 is brought into contact with the hinge 3 as an axis. Therefore, as shown in FIGS. 4, 5, since the mating recess portion 23 and the mating protruded portion 24 are provided in the place where the first divided body 18 or the second divided body 19 is pressed down by the fingers, for example, the mating recess portion 23 and the mating protruded portion 24 are used as a catching portion, so that the second clamping part 33 can readily be pressed down. When the clamping part 33 is pressed down by gripping the first clamping part 18 or the second clamping part 19, moreover, the second clamping part 33 can readily be pressed down because the mating recess portion 23 and the mating protruded portion 24 provided at the gripping location function as skidding stoppers. Consequently, the fixture 1 is readily installed.

Further, the first and second divided bodies 18 and 19 are joined together over the substantially whole area in their axial direction to ensure that the divided bodies are joined together and at the same time that the third face 3c of the hinge 3 can readily be forced (pressed) in the second clamping part 33.

As shown in FIGS. 1 and 4, as the forms of joining the side end portions and the central portions of the first and second divided bodies 18 and 19 are different from each other, the first and second divided bodies 18 and 19 never shift axially. Accordingly, it is ensured that the first and second divided bodies can be joined together.

The contact portion 31 is provided with the recess portion 40 and the inner face of the first clamping part 32 is formed so that the projected portion 41 is brought into contact with the second face 3b of the hinge 3. Consequently, the falling (falling of the first slip-out preventive portion 39 toward the contact portion 31) of the U-shaped portion formed with the side of the second end portion 31c of the contact portion 31, the first clamping part 32 and the first slip-out preventive portion 39 can be prevented. In other words, in case that the portion including the second end portion 31 of the contact portion 31, the first clamping part 32 and the slip-out preventive portion 39 is formed into the U-shape without the recess portion 40 and projected portion 41 as shown in FIGS. 8 and 9, the first slip-out- preventive portion 39 may fall toward the contact portion 31. However, since the provision of the recess portion 40 and the projected portion 41 results in reducing the thickness of the contact portion 31 having the recess portion 40 and that of the first clamping part 32 excluding the projected portion 41, cooling after molding is facilitated and particularly the corner portions is cooled first as the corner portions are thinner, whereby the falling mentioned above hardly occurs. Thus the fixture 1 with the regular dimensions secured can be molded.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A fixture, comprising:
   a fitting portion, fitting a long member; and
   a mounting portion, mounting a stationary portion which is shaped into a rectangular cross section, and the mounting portion including:
   a base portion provided on a first side of the stationary portion; and
   a first clamping portion and a second clamping portion, extending in a first direction substantially perpendicular to an extending direction of the base portion from both ends of the base portion, and clamping the stationary portion therebetween, and the clamping portions respectively having slip-out preventive portions which contact a second side of the stationary portion opposite the first side,
   wherein a projected portion is provided on an inner face of the first clamping portion and contacts a third side of the stationary portion which is different from the first and second sides of the stationary portion; and
   wherein the second clamping portion is flexibly formed.

2. The fixture as set forth in claim 1, wherein the length of the projected portion is so dimensioned that only the projected portion makes contact with the edge-to-edge face of the stationary portion when the mounting portion is fitted to the stationary portion.

3. The fixture as set forth in claim 1, wherein the slip-out preventive portion of the second clamping portion has a tilted portion which tilts toward the first clamping portion so as to decrease a thickness thereof in the first direction.

4. A fixture, comprising:
   a cylindrical fitting portion, fitting a long member; and
   a mounting portion, mounting a stationary portion which is shaped into a rectangular cross section, and the mounting portion including:
   a base portion; and
   a first clamping portion and a second clamping flexible portion, extending in a first direction substantially perpendicular to an extending direction of the base portion from both ends of the base portion, and clamping the stationary portion therebetween, and the clamping portions respectively having slip-out preventive portions,
   wherein the fitting portion is formed by a first divided body and a second divided body, each has a retaining portion, and the first divided body and the second divided body are coupled by a coupling hinge portion;
   wherein the retaining portions are protruded from an outer face of the cylindrical fitting portion when the first and second divided bodies are engaged by the retaining portions;
   wherein the engaged retaining portions are positioned on the fitting portion so as to serve a point of applying power when mounting the fixture to the stationary portion by using a principle of leverage so as to deflect the second clamping portion such that the first and second clamping portions clamp the stationary portion;
   wherein the coupling hinge portion is positioned adjacent to the base portion;
   wherein the engaged retaining portions are positioned further away from the base portion than the coupling hinge portion:
   wherein a projected portion is provided on an inner face of the first clamping portion;
   wherein the second clamping portion is flexibly formed; and
   wherein the length of the projected portion is so dimensioned that only the projected portion makes contact with the edge-to-edge face of the stationary portion when the mounting portion is fitted to the stationary portion.

5. The fixture as set forth in claim 4, wherein the retaining portions are extended in an axial direction of the cylindrical fitting portion from one edge to the other edge thereof.

6. The fixture as set forth in claim 4, wherein the slip-out preventive portion of the second clamping portion has a tilted portion which tilts to the first clamping portion so as to decrease a thickness thereof in the first direction.

* * * * *